E. L. UPSON & H. W. PLEISTER.
IMPLEMENT HANDLE.
APPLICATION FILED NOV. 21, 1912.
1,078,228.
Patented Nov. 11, 1913.
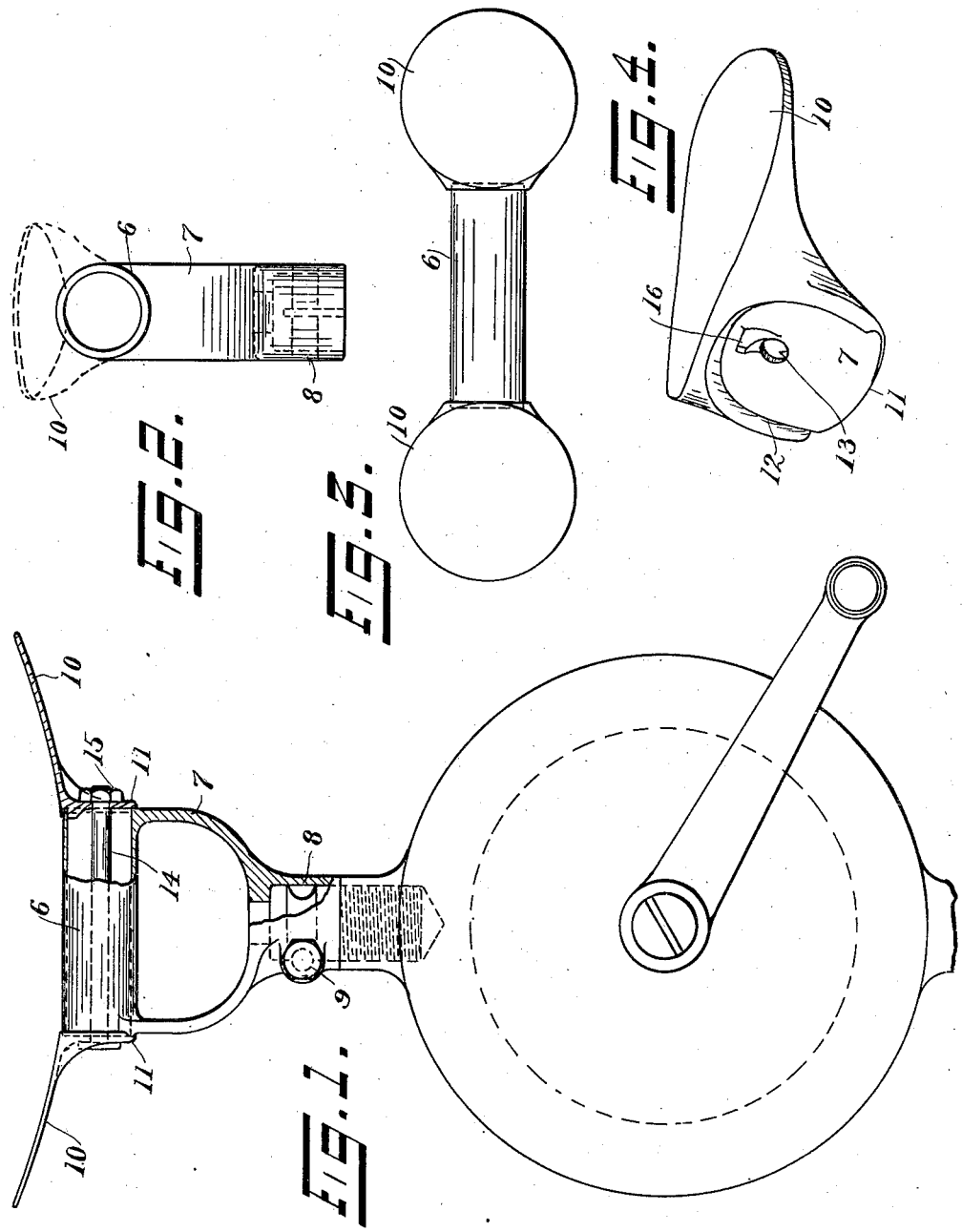
Witnesses:
Chas. E. Whiteman
H. D. Penney
Inventors:
Edwin L. Upson,
Henry W. Pleister,
By their Att'y,

UNITED STATES PATENT OFFICE.

EDWIN L. UPSON, OF BROOKLYN, NEW YORK, AND HENRY W. PLEISTER, OF WESTFIELD, NEW JERSEY, ASSIGNORS TO HENRY B. NEWHALL, OF PLAINFIELD, NEW JERSEY.

IMPLEMENT-HANDLE.

1,078,228.      Specification of Letters Patent.      Patented Nov. 11, 1913.

Application filed November 21, 1912. Serial No. 732,657.

*To all whom it may concern:*

Be it known that we, EDWIN L. UPSON, a citizen of the United States, residing at Brooklyn, in the county of Kings and State of New York, and HENRY W. PLEISTER, a citizen of the United States, residing at Westfield, in the county of Union and State of New Jersey, have invented certain new and useful Improvements in Implement-Handles, of which the following is a specification.

This invention has for its object to provide an improved form of handle for implements where it is desired to provide pressure by exerting the weight of the body, especially at the breast, on the handle of the implement, so that the implement can be operated under considerable pressure, and which handle portion at another time can be grasped by one hand of the operator to position and steady the implement, while the other hand is free to actuate the moving member of the implement.

A further object of the invention is to provide extension members on the gripping portion that are readily detachable when desired to use the implement merely by grasping it with the hand.

In the accompanying drawings, representing one embodiment of our invention, Figure 1 shows an implement in the nature of a drill with our invention applied thereto; Fig. 2 is a side elevation of the handle or gripping portion with the wings detached; Fig. 3 is an end view of the device as shown in Fig. 1; and, Fig. 4 shows one of the wing members detached, and somewhat enlarged.

In the drawing the device is shown as having a main or body member formed of a bar portion 6, having each extremity connected with a bail portion 7. The bail is in the form of a semi-circular strap, and may be integral with the bar 6 that is shown tubular, with the extremities open. The bail 7, at its lower portion, may be provided with suitable means for securing to the implement proper, such as a socket portion 8, that may be split and provided with a clamping bolt 9 in the wellknown manner, but which latter feature forms no part of the present invention. The part described is in the nature of a spade handle, and can be easily grasped by the hand of the operator. At each end of the bar 6 is secured a wing member, in the form of a plate or blade 10 having an offset lug 11 extending at an angle, preferably so that the two wings 10 that are secured at each end by these lugs, will lie in a curve of large radius, and the blades themselves may be slightly curved in the same direction, as indicated. These blades may be permanently secured or form a part of the bar 6, or they may be readily detachable, as shown.

The lug 11 is provided with an annular ledge 12 forming a kind of socket to receive the circular extremity of the bar 6, and an aperture 13 is provided in each of the lugs 11 for the purpose of receiving a securing bolt 14, that passes axially through the bar 6 and through these two apertures, and has a nut 15 screwed on one end by which the two wings are rigidly secured to the bar member, and through the medium of a single bolt. To assist in positioning the wings a lug 16 is provided adjacent the aperture 13 to enter the bore of the bar 6 and engage the inner wall. These wings, together with the handle, form a breast plate at the top of the implement that will operate like the usual form of breast drill, to be placed against the breast of the user. At the same time the bar 6, between the wings, can be grasped by the hand of the user when it is desired to hold the implement by these means, and the wings will not interfere in any way with the normal use of the handle. But if desired, the nut can be unscrewed and the bolt removed, whereupon the wings are at once detached, leaving the handle of the implement entirely free for grasping by the operator. It will be further seen that such arrangement is very simple and economic in its construction, being a simple tubular bar integrally connected with a bail having a socket portion. The wings can be plain castings and simply provided with the apertures in their lugs. And an ordinary bolt is passed through these apertures and through the bore of the handle portion and secured by its nut, whereby the wings are rigidly secured at the ends, respectively, of the handle portion.

Having thus described our invention, we claim:—

1. In an implement handle, a body portion comprising a bar and a bail portion secured to the ends of the bar, and a pair of wings each detachably secured to one end of said bar projecting in opposite directions and extending substantially transverse to the plane of the bail.

2. In an implement handle, a body portion comprising a hollow bar and a bail secured to the ends of the bar, a pair of wings having apertured lug portions, and a securing device engaging said lug portions and passing through the hollow bar, whereby the wings are secured at the respective ends of the bar extending in opposite directions and lying substantially transverse to the plane of the bail.

3. In an implement handle, a body portion comprising a hollow bar and a bail portion secured to the ends of the bar, a pair of wings each having an apertured lug, each lug having on the outer face a socket portion arranged to receive the extremity of the hollow bar, and a bolt passing through the hollow bar and engaging by its extremities the apertured lug portions of the wings to detachably secure them to the ends of the bars extending in opposite directions and located transverse to the plane of the bail.

EDWIN L. UPSON.
HENRY W. PLEISTER.

Witnesses:
HENRY B. NEEDHAM,
A. M. WILLIAMS.

---

Copies of this patent may be obtained for five cents each, by addressing the "Commissioner of Patents, Washington, D. C."